US007065664B2

(12) United States Patent
Yang

(10) Patent No.: US 7,065,664 B2
(45) **Date of Patent: *Jun. 20, 2006**

(54) POWER MANAGEMENT FOR A PDA SYSTEM

(75) Inventor: Hsiung-Chih Yang, Taipei Hsien (TW)

(73) Assignee: Inventec Appliances Corp., Taipei (TW)

( * ) Notice: Subject to any disclaimer, the term of this patent is extended or adjusted under 35 U.S.C. 154(b) by 428 days.

This patent is subject to a terminal disclaimer.

(21) Appl. No.: 10/249,125

(22) Filed: Mar. 18, 2003

(65) Prior Publication Data

US 2004/0187039 A1 Sep. 23, 2004

(51) Int. Cl.
*G06F 1/32* (2006.01)

(52) U.S. Cl. ......................... 713/324; 713/323; 702/63

(58) Field of Classification Search ................ 713/300, 713/323, 324, 320; 702/63

See application file for complete search history.

(56) References Cited

U.S. PATENT DOCUMENTS 5,581,772 A * 12/1996 Nanno et al. ............... 713/340
5,659,761 A * 8/1997 DeArras et al. ............ 713/300
6,901,338 B1 * 5/2005 Ching ......................... 702/63
2003/0159076 A1 * 8/2003 Delisle et al. .............. 713/300
2004/0250146 A1 * 12/2004 Oshima et al. ............. 713/320

* cited by examiner

*Primary Examiner*—Chun Cao
(74) *Attorney, Agent, or Firm*—WInston Hsu

(57) ABSTRACT

A method for achieving power management for a PDA is disclosed. The PDA contains a CPU for processing data, a microprocessor for supervising power condition of the PDA, and a display module for displaying data and information. The microprocessor and the CPU are used to switch the PDA from OFF mode to SHUTDOWN mode. When the PDA is in OFF mode, the CPU, the microprocessor, and the display are all off, and when the PDA is in SHUTDOWN mode, the CPU and the display module are off while the microprocessor is on. Next, the PDA is switched from SHUTDOWN mode to ON mode. When the PDA is in ON mode, the CPU, the microprocessor, and the display module are on. The PDA can then be switched among SHUTDOWN mode, STANDBY mode, and SCREEN TOGGLE mode for managing the power of the PDA.

23 Claims, 7 Drawing Sheets

OFF mode
Micorprocessor : off
CPU : off
Display module : off
Memory : off
Input keys : sleep
Power supply part : on Turn on the slide switch SHUTDOWN mode
Microprossor : off
CPU : off
Display module : off
Memory : off
Input keys : off Press the power button ON mode
Micropressor : on
CPU : on
Display module : on
Memory : off
Input keys : on/sleep
Power supply part : on Press the power button
Press the screen-toggle key
Press the power button or the screen-toggle key STANDBY mode
Microprocessor ; sleep
CPU : idle
Display module ; off
Memory : low-power
Input keys : sleep
Power supply part : on SCREEN TOGGLE mode
Microprocessor : on
CPU : on
Display module : off
Memory : on
Input keys : sleep
Power supply part : on Microprocessor awakes itself very period T

| | CPU | Microprocessor | Input keys | Display panel | Front light | Memory | DC_VCC | 3.3/5.5V |
|---|---|---|---|---|---|---|---|---|
| ON mode | on | on | sleep/ on | on | on/ off | on | on | on |
| SCREEN TOGGLE mode | on | on | sleep | off | off | on | on | on |
| STANDBY mode | idle | sleep | sleep | off | off | low-power | on | on |
| OFF mode | off | off | sleep | off | off | low-power | on | on |
| SHUTDOWN mode | off | on | off | off | off | off | on | off |

Fig. 7

POWER MANAGEMENT FOR A PDA SYSTEM

BACKGROUND OF THE INVENTION

1. Field of the Invention

The invention relates to a method for managing a power system of a PDA, and more particularly, to a method for switching the PDA among SHUTDOWN mode, ON mode, SCREEN TOGGLE mode, and STANDBY mode to manage the power system of the PDA.

2. Description of the Prior Art

Nowadays, low-polluting electric power applications are advocated and many electric appliances use electric power to operate. A reduction in the volume and the weight of electric appliances makes the appliances more convenient and portable. A PDA (Personal Digital Assistant) is a portable and popular device and can allow users to manage their schedules and to store data. Compared with a desktop or a notebook, it is more convenient for users who have to deal with computer data mobilely like sales and on-line production managers. Like other portable electric appliances, a battery is the main power supply source in the PDA, but the volume of the battery is limited in a PDA. A power control system can alert users to the exhaustion of the volume of the battery and allow users to control the consumption of the volume of the battery. For instance, users can store data, change another battery, or recharge the PDA using an external power supply before the exhaustion of the battery so that data is not lost or so that damage does not occur in the PDA due to over-discharging. In view of the above, an effective and perfect power control system is emphasized in modern industry.

To reduce the power consumption of a PDA in the present power control system, the power supply of the electric component can be cut or reduced when the system is in an idling state. The power control system in the PDA is capable of detecting whether input buttons, display devices, and other components are switched on. If the power control system does not detect any activity during a certain period, the power supply of the main system will be shut down temporarily. However, in the prior art, the power management of the PDA is usually mainly controlled by the CPU, and the feasibility of using the microprocessor to control the power management of the PDA is neglected. Therefore, besides consuming a lot of system resources, the prior art method is dangerous because the large power consumption of using the CPU to control the power management of the whole system could result in over-discharging. In addition, the most power-consuming part of the PDA is the display panel. The prior art usually neglects to consider the power consumption of the display panel when utilizing the power management of the PDA so that the danger of over-discharging still exists. To solve the above-mentioned problems, first, not only can the technology of the prior art pertaining to the power control system of the microprocessor be utilized, but also the microprocessor can be used to supervise the whole power control system in the PDA. Besides, the display panel and other related peripherals should be taken into consideration of the power management of the PDA.

SUMMARY OF THE INVENTION

It is therefore a primary objective of the claimed invention to provide a method for achieving power management for a PDA system to solve the above-mentioned problems of the prior art.

According to the claimed invention, a method for achieving power management of a PDA is provided. The PDA comprises a CPU for processing data; a microprocessor for supervising the power system of the PDA; and a display module for displaying the data. The method comprises (a) switching the PDA from OFF mode to SHUTDOWN mode, wherein when the PDA is in OFF mode, the CPU, the microprocessor, and the display are all off, and when the PDA is in SHUTDOWN mode, the CPU and the display module are off while the microprocessor is on; (b) after step (a), switching the PDA from SHUTDOWN mode to ON mode, wherein when the PDA is in ON mode, the CPU, the microprocessor, and the display module are all on; (c) after step (b), switching the PDA between ON mode and SCREEN TOGGLE mode, wherein when the PDA is in SCREEN TOGGLE mode, the CPU and the microprocessor are on while the display module is off; and (d) after step (b), switching the PDA between ON mode and STANDBY mode, wherein when the PDA is in STANDBY mode, the CPU is idle, the microprocessor sleeps, and the display module is off, and an operating current of the CPU when the CPU is idle is smaller than the operating current when the CPU is on, and an operating current of the microprocessor when the microprocessor sleeps is smaller than the operating current when the microprocessor is on.

According to the claimed invention, a PDA capable of managing power of the PDA comprises a power operating system comprising a slide switch for switching the PDA from OFF mode to SHUTDOWN mode; a power button for switching the PDA among SHUTDOWN mode, ON mode, SCREEN TOGGLE mode, and STANDBY mode; and a screen-toggle key for switching the PDA from ON mode to SCREEN TOGGLE mode; a CPU for processing data; a microprocessor for supervising the power operating system; and a display module for displaying the data; wherein when the slide switch is turned on, the PDA is switched from OFF mode to SHUTDOWN mode, wherein when the PDA is in OFF mode, the CPU, the microprocessor, and the display are all off, and when the PDA is in SHUTDOWN mode, the CPU and the display module are off while the microprocessor is on; when the power button is pressed, the PDA is switched from SHUTDOWN mode to ON mode, wherein when the PDA is in ON mode, the CPU, the microprocessor, and the display module are all on; when the screen-toggle key is pressed, the PDA is switched from ON mode to SCREEN TOGGLE mode, wherein when the PDA is in SCREEN TOGGLE mode, the CPU and the microprocessor are on while the display module is off; when the power button is pressed during the PDA being in SCREEN TOGGLE mode, the PDA is switched from SCREEN TOGGLE mode to ON mode; when the PDA is in ON mode with the power button pressed, the PDA is switched from ON mode to STANDBY mode, wherein when the PDA is in STANDBY mode, the CPU is idle, the microprocessor sleeps, and the display module is off; when the power button is pressed repeatedly, the PDA is switched between ON mode and STANDBY mode; an operating current of the CPU when the CPU is idle is smaller than the operating current when the CPU is on, and an operating current of the microprocessor when the microprocessor sleeps is smaller than the operating current when the microprocessor is on.

It is an advantage of the claimed invention that instead of the CPU, the microprocessor is used to supervise and manage a power managing system of the PDA for reducing the power consumption and avoiding over-discharging damage to the PDA.

It is an advantage of the claimed invention that a display panel and other related peripherals are all taken into consideration of the power management of the PDA.

It is an advantage of the claimed invention that when the remaining power volume of the PDA is less than a critical voltage, the microprocessor is capable of switching the CPU from being on to being idle, or preventing the CPU from switching from being idle to being on when the CPU is idle, for avoiding the over-discharging damage to a battery. In addition, when the remaining power volume of the PDA detected by the gas gauge is less than a cut-off voltage, the PDA is switched from SCREEN TOGGLE mode or STANDBY mode to SHUTDOWN mode.

These and other objectives and advantages of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 7 is a list showing all the conditions in various modes in the embodiment as shown in FIG. 4.

DETAILED DESCRIPTION OF THE PREFERRED EMBODIMENT

Figure 1:
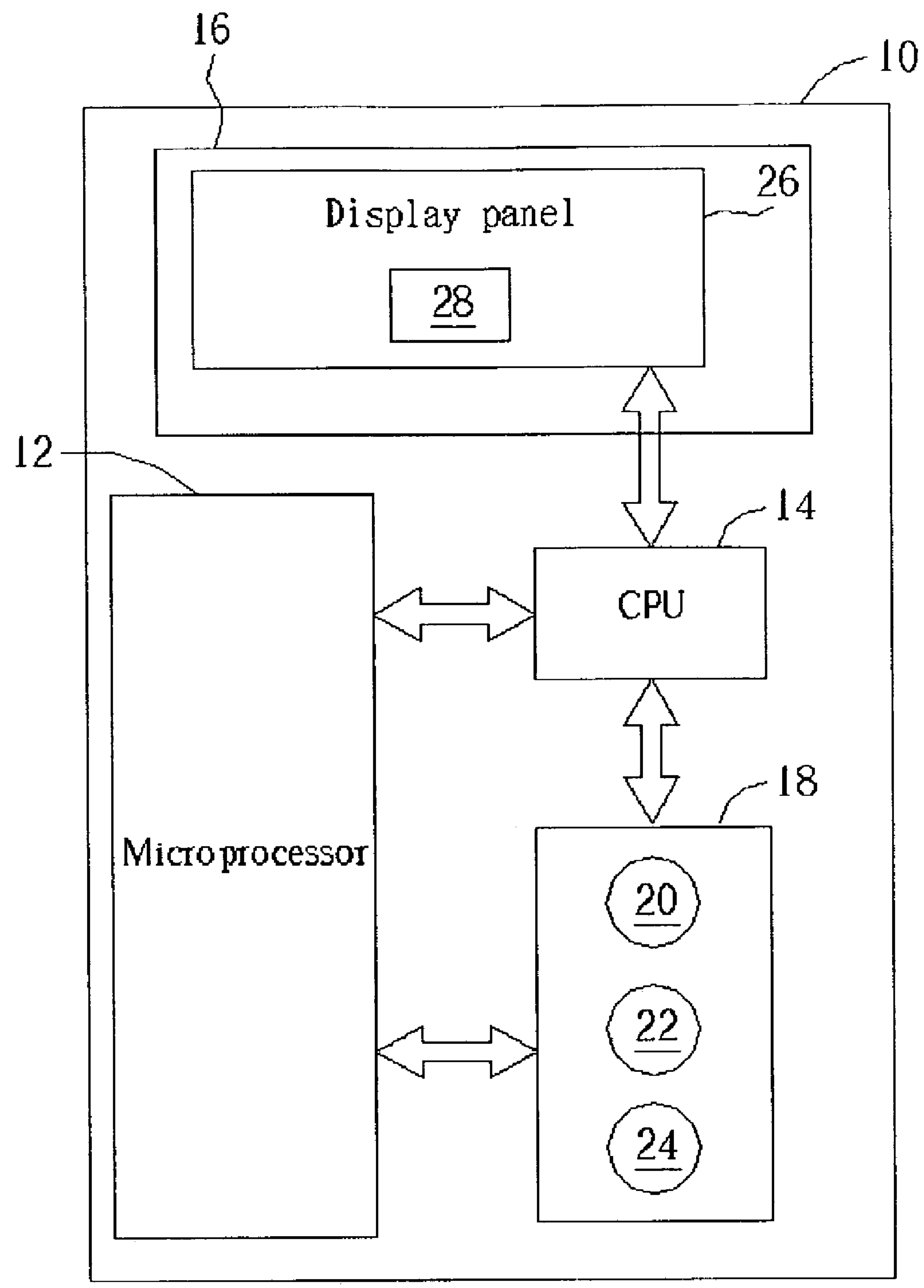
FIG. 1 is a functional block diagram of an embodiment of a PDA.

Please refer to FIG. 1, which is a functional block diagram of an embodiment of a PDA 10 of the present invention. The PDA 10 comprises a CPU 14, a microprocessor 12, a display module 16, and a power operating system 18. The present embodiment does not include peripherals of the PDA 10 for emphasizing a basic structure of the PDA 10 regarding power management. The user can make use of the power operating system 18 to switch the PDA 10 among various modes. The power operating system 18 comprises a slide switch 20, a power button 22, and a screen-toggle key 24. The display module 16 comprises a display panel 26 and a front light 28. The display panel 26 can be an LCD panel or an LTPS LCD panel. In addition, inside the PDA 10, the microprocessor 12 is electrically connected to the power operating system 18 and the CPU 14 of the PDA 10 for controlling the related power system of the PDA 10. The CPU 14 is also electrically connected to the power operating system 18, the microprocessor 12, and the display module 16 of the PDA 10 mainly for controlling the power conditions of the display module 16.

Figure 2:
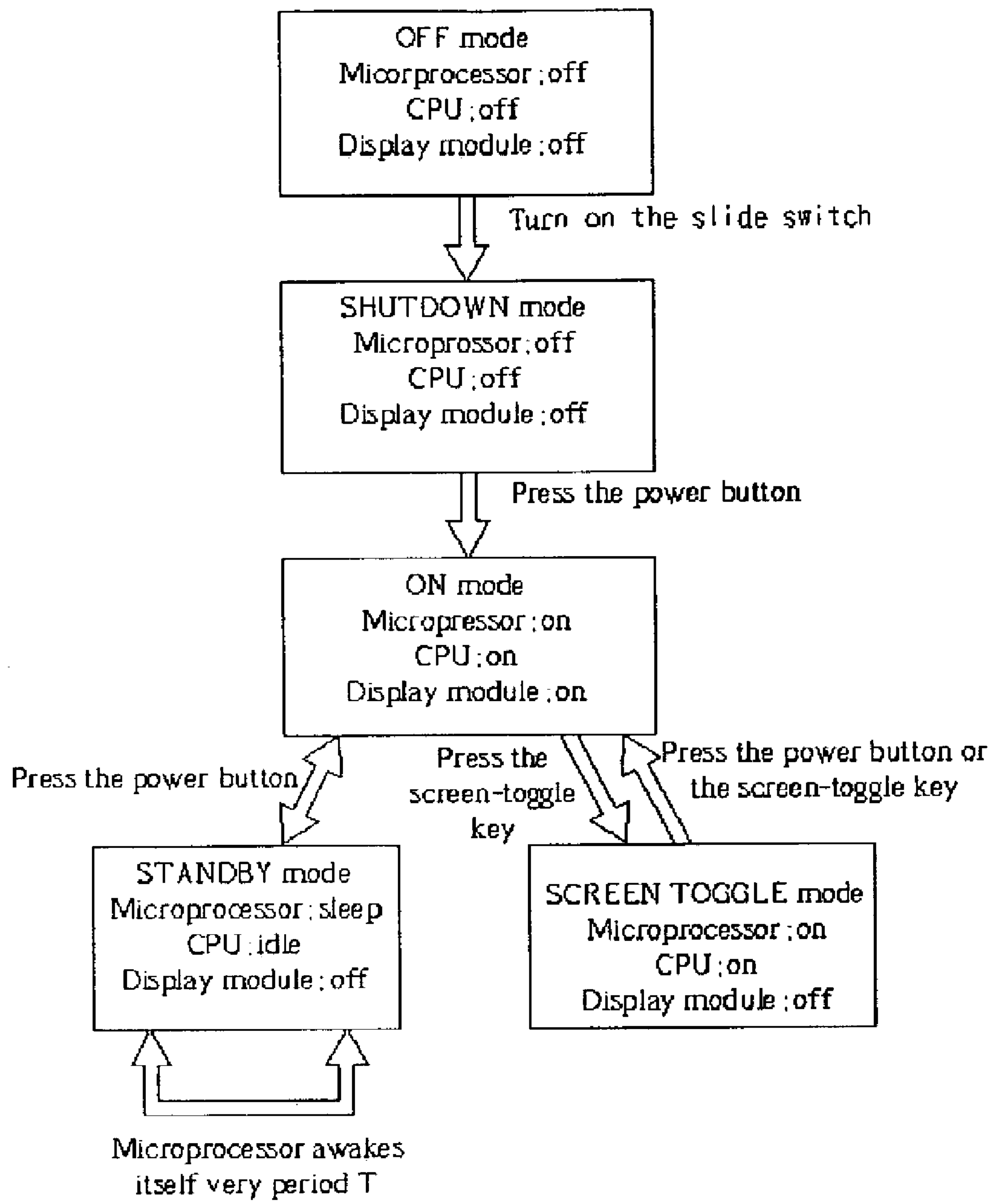
FIG. 2 is a state flowchart of the PDA as shown in FIG. 1 in different modes according to the present invention.

The user can switch the PDA 10 among various modes by pressing the slide switch 20, the power button 22, and the screen-toggle key 24 of the power operating system 18. Please refer to FIG. 2, which a state flowchart of the PDA 10 in different modes according to the present invention. When the user turns on the slide switch 20, the PDA 10 will be switched by the microprocessor 12 from OFF mode to SHUTDOWN mode. When the PDA 10 is in OFF mode, the CPU 14, the microprocessor 12, and the display module 16 are all off, and when the PDA 10 is in SHUTDOWN mode, the CPU 14 is off, the microprocessor 12 is on, and the display module 16 is off. After that, when the user presses the power button 22 or the screen-toggle key 24, the PDA 10 will be switched among SHUTDOWN mode, ON mode, SCREEN TOGGLE mode, and STANDBY mode. As shown in FIG. 2, when the PDA 10 is in SHUTDOWN mode, once the user presses the power button 22, the microprocessor 12 will switch the PDA 10 from SHUTDOWN mode to ON mode. In ON mode, the CPU 14, the microprocessor 12, and the display module 16 are on. Moreover, when the PDA 10 is in ON mode, the user can press the screen-toggle key 24 to utilize the CPU 14 to switch the PDA between ON mode and SCREEN TOGGLE mode; when the PDA 10 is in SCREEN TOGGLE mode, the user can press the screen-toggle key 24 and the power button 22 to switch the PDA 10 back to ON mode. When the PDA 10 is in SCREEN TOGGLE mode, the CPU 14 and the microprocessor 12 are on, and the display module 16 is off. When PDA 10 is in ON mode, the user can press the power button 22 to utilize the microprocessor 12 to switch the PDA 10 between ON mode and STANDBY mode. When PDA 10 is in STANDBY mode, the CPU 14 is idle, the microprocessor 12 sleeps, and the display module 16 is off. From the above-mentioned description, OFF mode, SHUTDOWN mode, ON mode, SCREEN TOGGLE mode, and STANDBY mode are those various modes for describing different power statuses of the PDA 10. Please notice that most of the modes are mainly controlled and supervised by the microprocessor 12, and only those modes related to the display module 16 are mainly controlled by the CPU 14.

Please continue referring to FIG. 2. When the PDA 10 is in OFF mode, that is, the CPU 14, the microprocessor 12, and the display module 16 are off. The display panel 26 and the front light 28 of the display module 16 are off so that no operating current is consumed. When the user turns on the slide switch 20, the PDA 10 is switched to SHUTDOWN mode, the CPU 14 and the display module 16 are still off while the microprocessor 12 is turned into being on. That is, the microprocessor 12 can operate based on a stable supplied voltage and consume a stable current. The microprocessor 12 consumes less power than the CPU 14 does. Generally, due to that the full operating current of the microprocessor 12 is around several mA, the PDA 10 only consumes little power in SHUTDOWN mode. If the user wants to perform the whole functions of the PDA 10, the user can press the power button 22 to utilize the microprocessor 12 to switch the PDA 10 from SHUTDOWN mode to ON mode. Then the CPU 14 and the microprocessor 12 are on. Regarding the display module 16, the display panel 26 is on while the front light 28 will be switched between being off and being on. In brief, the CPU 14, the display panel 26, and the microprocessor 12 can respectively fully operate based on a stable supplied voltage. Generally, the full operating current of the CPU 14 is around about one hundred mA to several hundreds mA during maximum operation, which is much higher than the full operating current of the microprocessor 12. Actually, the full operating current of the display panel 26 is the main power-consuming source of the PDA 10. When the PDA 10 is in ON mode, if the user does not input any signal into the PDA 10 during a predetermined period of time, the front light 28 will automatically turn off. When PDA 10 is in SCREEN TOGGLE mode, the display panel 26 and front light 28 are off without any power consumption. When PDA 10 is in STANDBY mode, the display panel 26 and front light 28 are also off. Please notice that when the CPU 14 is idle, the operating current of the CPU 14 is much less than the full operating current of the CPU 14. When the microprocessor 12 sleeps, the microprocessor 12 operates at a clock with a period T and is on during half of the period T and is off during another half of the period T. Therefore, the appropriate period value, which is less than the period value the user spends turning on buttons, can allow the microprocessor 12 to detect any operation from the user during half of the period T in which the microprocessor 12 is on for awakening the microprocessor 12 and the PDA 10 again.

Please notice, all the designs, including SCREEN TOGGLE mode, automatic switch of the front light 28 from being on to being off, of the present embodiment significantly reduce the power consumption by effectively managing the display panel 26 and the front light 28. In addition, when the microprocessor 12 sleeps, the operating current of the microprocessor 12 will decrease to several μA which is much less than the value of the full operating current of the microprocessor 12. In preliminary summary, the PDA 10 can save a lot of power from the display panel 26, the front light 28, the microprocessor 12, and CPU 14 to greatly increase the operating time of the PDA 10.

Figure 3:
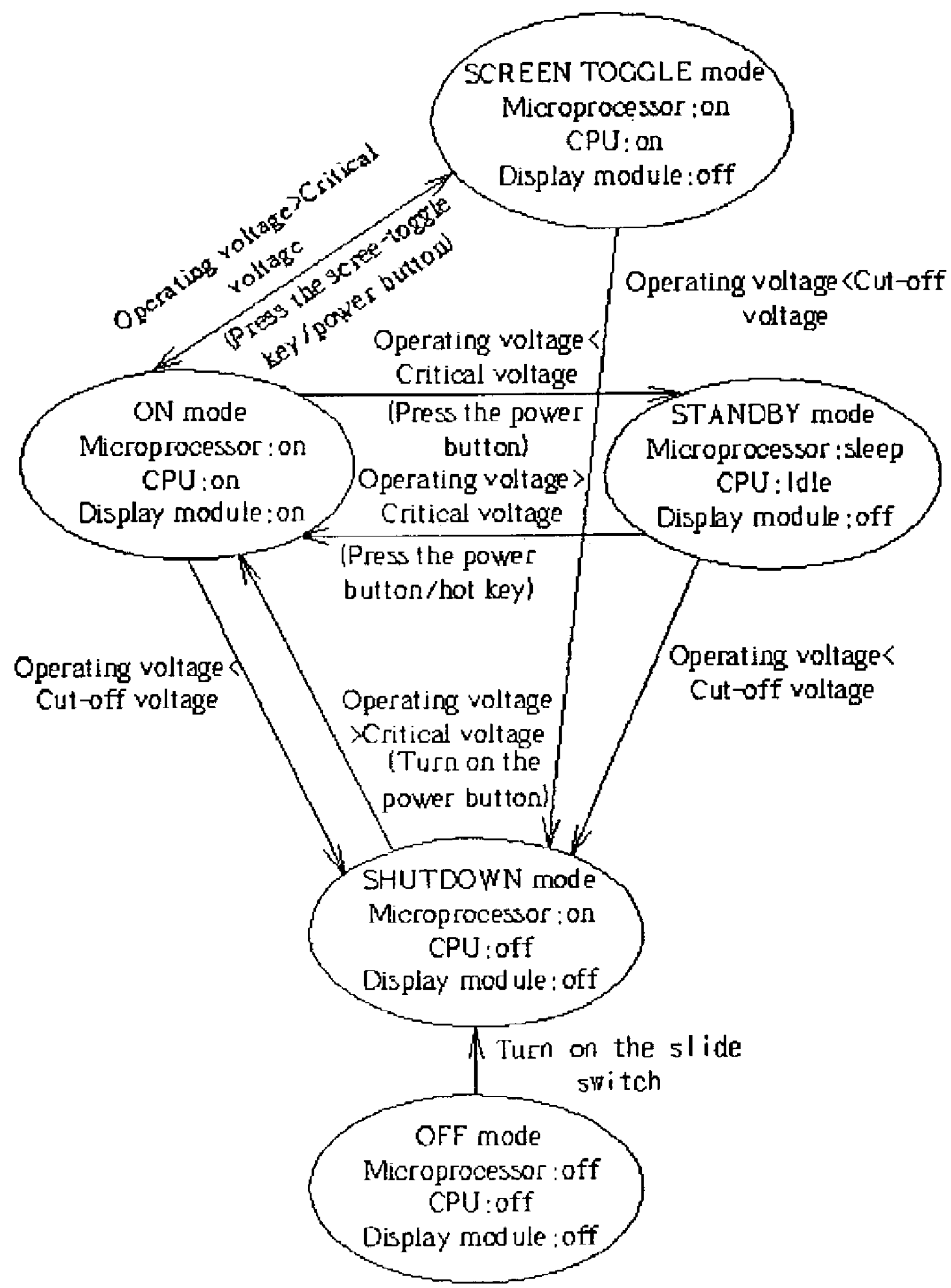
FIG. 3 is a flowchart of the different voltage values of the PDA as shown in FIG. 1 in different modes according to the present invention.

Please refer to FIG. 3, which is a flowchart of the different voltage values of the PDA 10 in different modes according to the present invention. When the remaining power volume of the PDA 10 is less than a critical voltage, if the CPU 14 is on, the microprocessor 12 will switch the CPU 14 to being idle (the PDA 10 is switched to STANDBY mode), if the CPU 14 is idle, the microprocessor 12 will prevent the CPU 14 from being switched to being on for avoiding over-discharging effect to permanently damage the PDA 10. When the remaining power volume of the PDA 10 is less than a cut-off voltage and the PDA 10 is in STANDBY mode, the PDA 10 will switched from STANDBY mode to SHUTDOWN mode and then the CPU 14 is off. At this moment, only the microprocessor 12 takes charges of supervising the power conditions of the PDA 10. When the remaining power volume of the PDA 10 is less than a cut-off voltage and the PDA 10 is in SCREEN TOGGLE mode, the PDA 10 will be switched from SCREEN TOGGLE mode to SHUTDOWN mode for avoiding over-discharging damage to the PDA 10.

Figure 4:
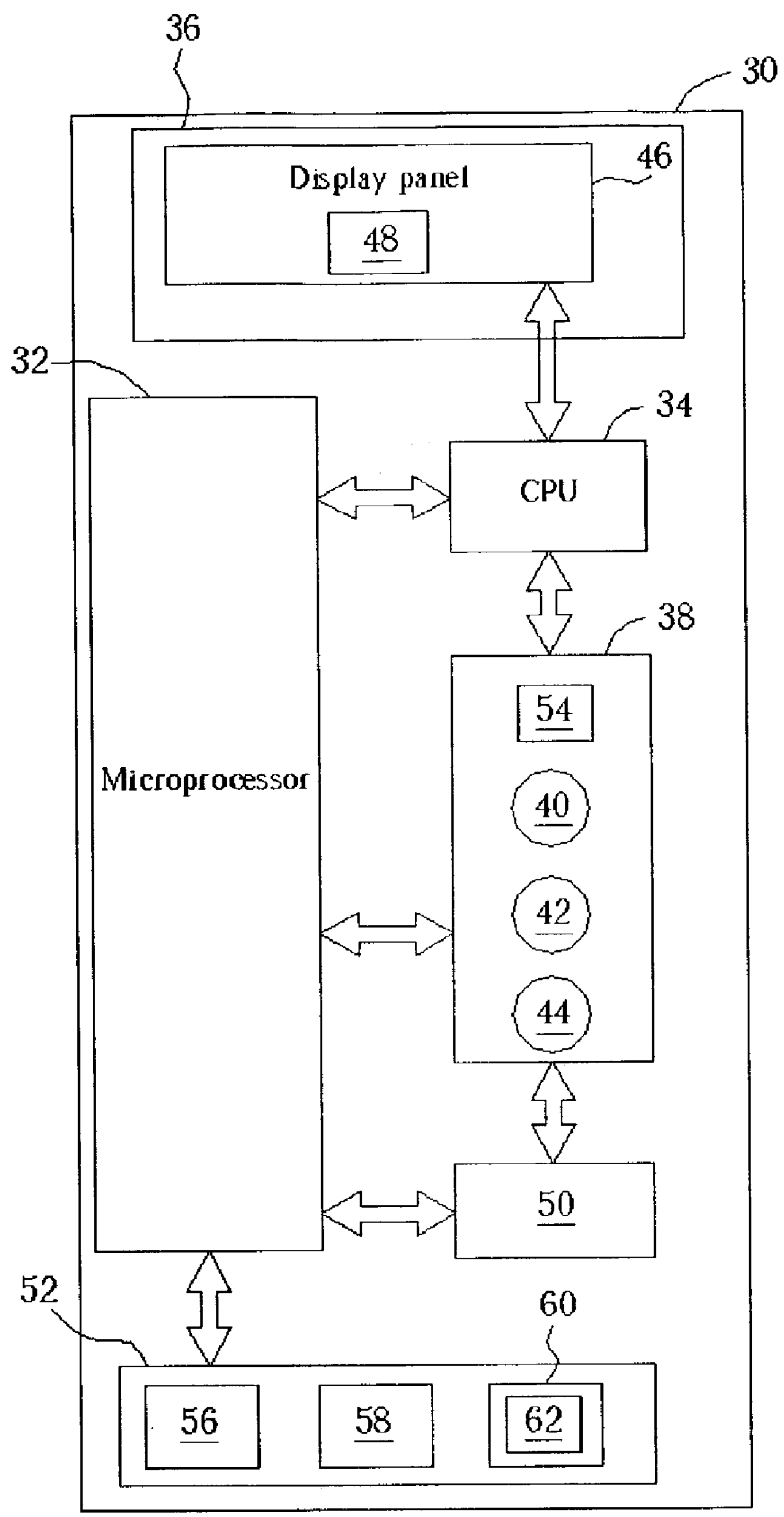
FIG. 4 is a functional block diagram of another embodiment of a PDA.

Please refer to FIG. 4, which is a functional block diagram of another embodiment of a PDA 30 of the present invention. The PDA 30 comprises a CPU 34, a microprocessor 32, a display module 36, a power operating system 38, an LED panel 50, and a plurality of peripherals 52. The present embodiment includes the peripherals 52 of the PDA 30 for detailing the power managing system of the present invention. The power operating system 38 comprises a slide switch 40, a power button 42, and a screen-toggle key 44. As with the previous embodiment, the PDA 30 can still be switched among various modes by the power operating system 38.

Please continue referring to FIG. 4. The display module 36 comprises a display panel 46 and a front light 48. The display panel 46 can be an LCD panel or an LTPS LCD panel. The power operating system 38 further comprises a gas gauge 54 for detecting a remaining power volume of the PDA 30. The peripherals 52 include a memory 56, a power supply port 58, and a plurality of input keys 60. The memory 56 is used for storing data, the power supply port 58 is used for providing external power supply, and the input keys 60 are used for the user to input signals into the PDA 30. The input keys 60 include at least a hot key 62. In addition, the microprocessor 32 is electrically connected to the power operating system 38, the CPU 34, the peripherals 52, and the LED panel 50 of the PDA 30, and the CPU 34 is electrically connected to the power operating system 38, the microprocessor 32, and the display module 36 of the PDA 30 mainly for controlling the display module 36.

Figure 5:
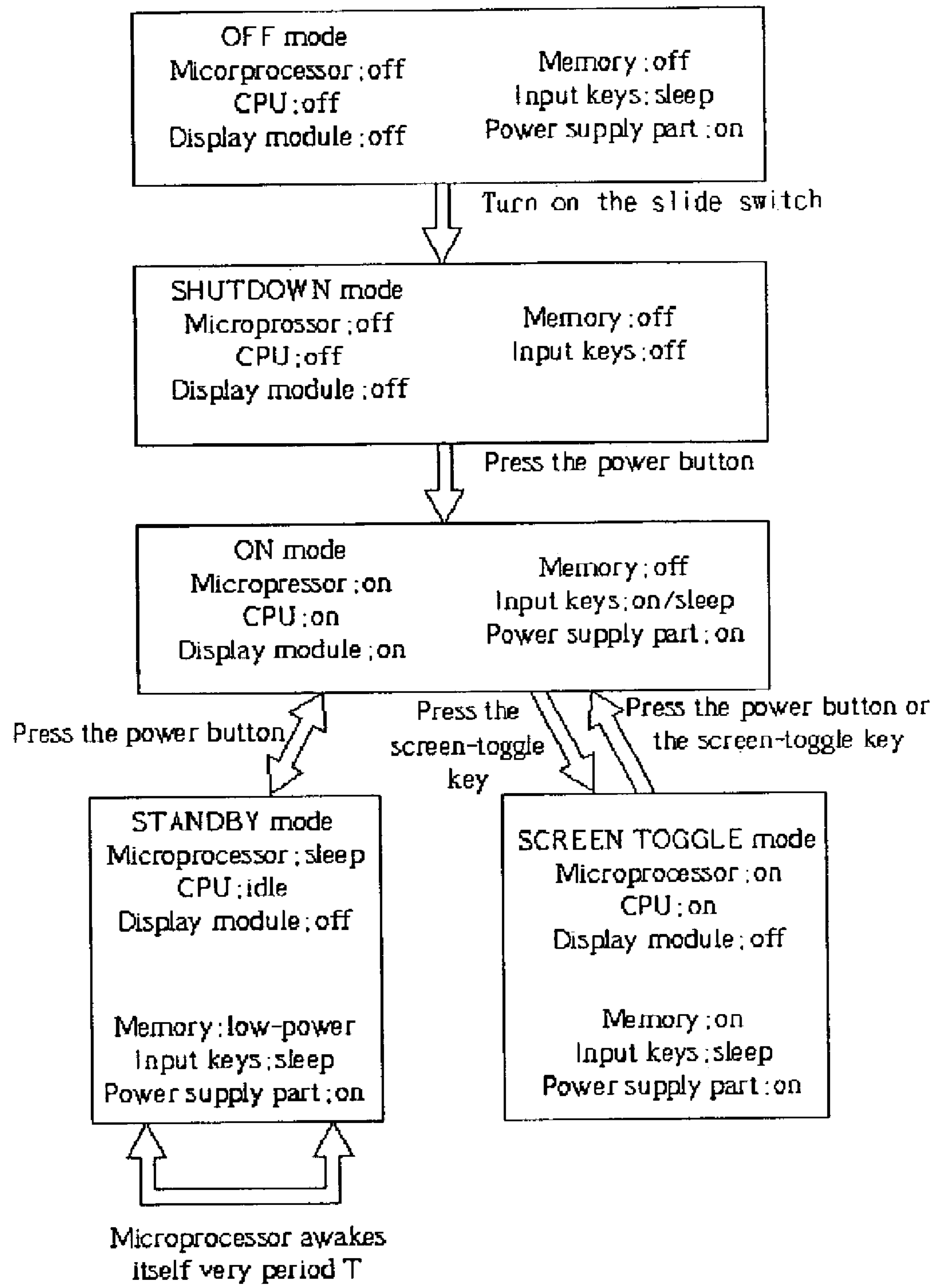
FIG. 5 is a state flowchart of the PDA as shown in FIG. 4 in different modes according to the present invention.

The user can press the slide switch 40, the power button 42, and the screen-toggle key 44 of the power operating system 38 to switch the PDA 30 among various modes. Please refer to FIG. 5, which is a state flowchart of the PDA 30 in different modes according to the present invention. When the user turns on the slide switch 40, the PDA 30 will be switched from OFF mode to SHUTDOWN mode. When the PDA 30 is in OFF mode, the CPU 34, the microprocessor 32, the display panel 46 and the front light 48 of the display module 36, and the memory 56 are off while the input keys 60 sleep and the power supply port 58 is on. When the PDA 30 is in SHUTDOWN mode, the CPU 34, the memory 56, the display module 36, and the input keys 60 are off while the microprocessor 32 is on. As with the previous embodiment, the PDA 30 consumes little power in SHUTDOWN mode. After that, when the user presses the power button 42 or the screen-toggle key 44, the PDA 30 will be switched among SHUTDOWN mode, ON mode, SCREEN TOGGLE mode, and STANDBY mode. The detailed operations are described in FIG. 5. When the PDA 30 is in SHUTDOWN mode, if the user presses the power button 42, the microprocessor 32 will switch the PDA 30 from SHUTDOWN mode to ON mode so that the CPU 34, the microprocessor 32, the display panel 46, the memory 56, and the power supply port 58 are on. However, at this moment, the front light 48 will be switched between being off and being on, and the input keys 60 will be switched between sleeping and being on. That is, if the user does not make use of the PDA 30 for a predetermined period of time, the front light 48 will automatically turn off, and the input keys 60 will be automatically switched from being on to sleeping. All the above-mentioned designs are for saving power. When PDA 30 is in ON mode, the user can press the screen-toggle key 44 to utilize the CPU 34 to switch the PDA 30 between ON mode and SCREEN TOGGLE mode. When the PDA 30 is in SCREEN TOGGLE mode, the user can press the screen-toggle key 44, the power button 42, or the hot key 62 to return the PDA 30 to ON mode. When PDA 30 is in SCREEN TOGGLE mode, the CPU 34, the microprocessor 32, the memory 56, and the power supply port 58 are on while the input keys 60 sleep and the display module 36 is off. In addition, when the PDA 30 is in ON mode, the user can press the power button 42 to utilize the microprocessor 32 to switch the PDA 30 between ON mode and STANDBY mode. When PDA 30 is in STANDBY mode, the CPU 34 is idle, the microprocessor 32 sleeps, the display module 36 is off, the memory 56 is in a low-power status, the input keys 60 sleeps, and the power supply port 58 is on. Please notice that, as with the previous embodiment, when the microprocessor 32 sleeps, the microprocessor 32 operates at a clock with a period T and is in ON mode during half of the period T and is in OFF mode during another half of the period T. Therefore, the appropriate period value, which is less than the period value users spend turning on buttons, can allow the microprocessor 32 to detect any operation of users during half of the period T (in which the microprocessor 32 is on) for awakening the microprocessor 32 and the PDA 30 again. Please notice that most of the modes are mainly controlled and supervised by the microprocessor 32, and only those modes related to the display module 16 are mainly controlled by the CPU 34.

Please notice, as with the previous embodiment, all the designs, including SCREEN TOGGLE mode, automatic switch of the front light 48 from being on to being off, of the present embodiment significantly reduce the power consumption by effectively managing the display panel 46 and the front light 48. In preliminary summary, the PDA 30 can save the a lot of power from the display panel 46, the front light 48, peripherals 52, the microprocessor 32, and CPU 34 to greatly increase the operating time of the PDA 30.

Figure 6:
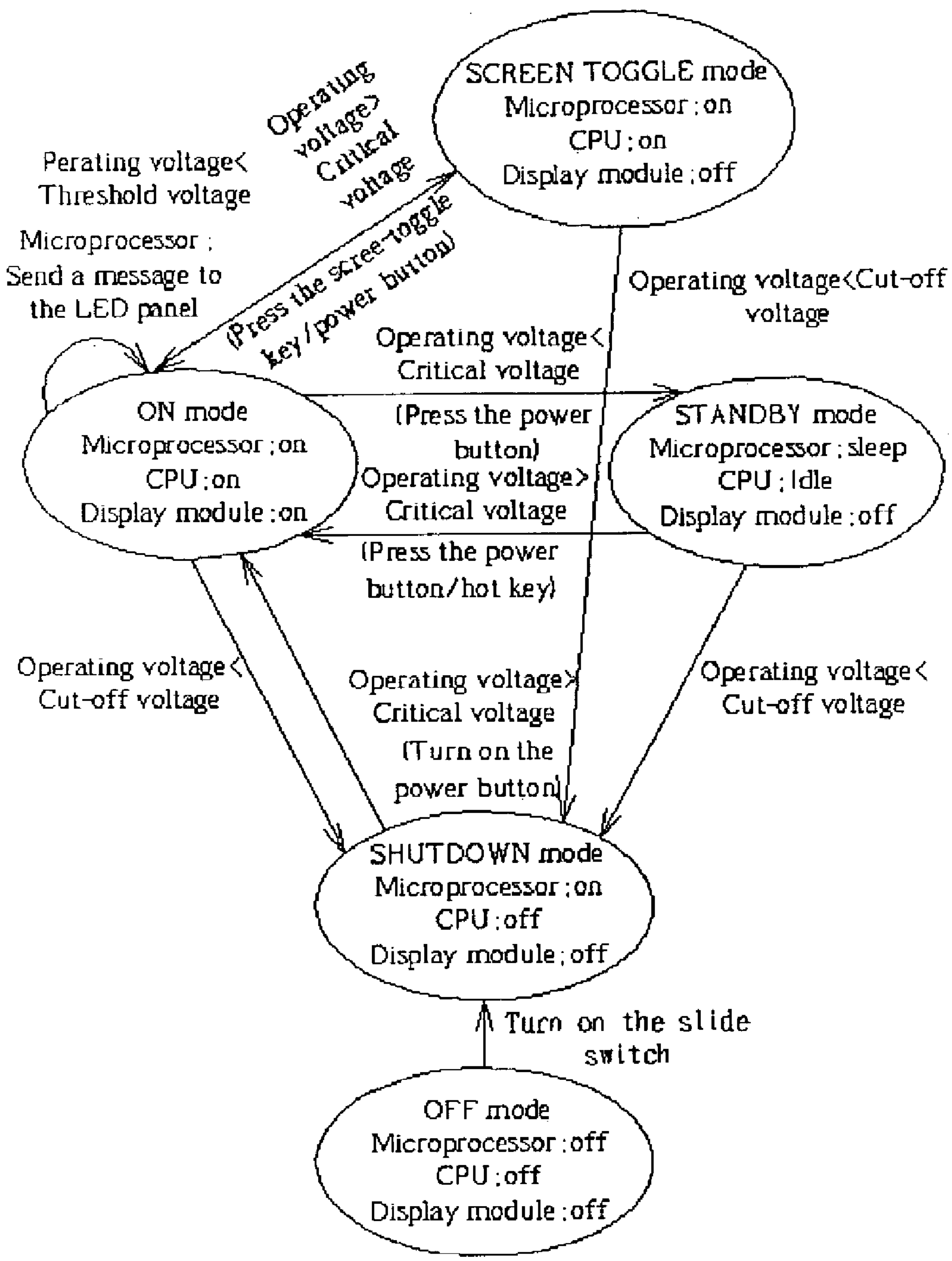
FIG. 6 is a flowchart of the different voltage values of the PDA as shown in FIG. 4 in different modes according to the present invention.

Please refer to FIG. 6, which is a flowchart of the different voltage values of the PDA 30 in different modes according to the present invention. When the remaining power volume of the PDA 30 detected by the gas gauge 54 is lower than a threshold voltage, the microprocessor 32 is capable of transmitting a message to the LED panel 40 so as to produce a flash of light on the LED panel 50. When the remaining power volume of the PDA 30 is less than a critical voltage, if the CPU 34 is on, the microprocessor 32 will switch the CPU 34 to being idle (the PDA 30 is switched to STANDBY mode), if the CPU 34 is idle, the microprocessor 32 will prevent the CPU 34 from being switched to being on for avoiding over-discharging effect to permanently damage the PDA 30. When the remaining power volume of the PDA 30 is less than a cut-off voltage and the PDA 30 is in STANDBY mode, the PDA 30 will be switched from STANDBY mode to SHUTDOWN mode and then the CPU 34 is off. At this moment, only the microprocessor 32 takes charges of supervising the power conditions of the PDA 30. When the remaining power volume of the PDA 30 is less than a cut-off voltage and the PDA 30 is in SCREEN TOGGLE mode, the PDA 30 will be switched from SCREEN TOGGLE mode to SHUTDOWN mode for avoiding over-discharging damage to the PDA 30.

Please refer to FIG. 7, which lists all the conditions in various modes in the embodiment as shown in FIG. 4. Please notice that the power supply port 58 as shown in FIG. 4 is divided into DC_VCC and 3.3/5.5V in FIG. 7 according different functions.

In contrast to the prior art, the present invention provides a method for achieving the whole power management of a PDA. A display panel and other related peripherals are all taken into consideration of the power management of the PDA. In addition, according to the present invention, the PDA can be switched among SHUTDOWN mode, ON Mode, SCREEN TOGGLE mode, and STANDBY mode for effectively saving power.

Those skilled in the art will readily observe that numerous modifications and alterations of the method may be made while retaining the teachings of the invention. Accordingly, the above disclosure should be construed as limited only by the metes and bounds of the appended claims.

What is claimed is:

1. A method for achieving power management of a PDA containing a CPU for processing data, a microprocessor for supervising a power system of the PDA, and a display module for displaying the data, the method comprising:

(a) switching the PDA from OFF mode to SHUTDOWN mode, wherein when the PDA is in OFF mode, the CPU, the microprocessor, and the display are all off, and when the PDA is in SHUTDOWN mode, the CPU and the display module are off while the microprocessor is on;

(b) after step (a), switching the PDA from SHUTDOWN mode to ON mode, wherein when the PDA is in ON mode, the CPU, the microprocessor, and the display module are all on;

(c) after step (b), switching the PDA between ON mode and SCREEN TOGGLE mode, wherein when the PDA is in SCREEN TOGGLE mode, the CPU and the microprocessor are on while the display module is off; and (d) after step (b), switching the PDA between ON mode and STANDBY mode, wherein when the PDA is in STANDBY mode, the CPU is idle, the microprocessor sleeps, and the display module is off, and an operating current of the CPU when the CPU is idle is smaller than the operating current when the CPU is on, and an operating current of the microprocessor when the microprocessor sleeps is smaller than the operating current when the microprocessor is on.

2. The method of claim 1 wherein the PDA further comprises a power operating system, and the power operating system comprises a slide switch for switching the PDA from OFF mode to SHUTDOWN mode, a power button for switching the PDA among SHUTDOWN mode, ON mode, SCREEN TOGGLE mode, and STANDBY mode, and a screen-toggle key for switching the PDA from ON mode to SCREEN TOGGLE mode, and step (a) is started by turning on the slide switch; step (b) is started by pressing the power button; step (c) is started by pressing the screen-toggle key or the power button; step (d) is started by repeatedly pressing the power button.

3. The method of claim 1 wherein the display module comprises a display panel and a front light, wherein when the PDA is in OFF mode, the display panel and the front light are off; when the PDA is in SHUTDOWN mode, the display panel and the front light are off; when the PDA is in ON mode, the display panel is on while the front light is operating between off and on; when the PDA is in SCREEN TOGGLE mode, the display panel and the front light are off; when the PDA is in STANDBY mode, the display panel and the front light are off.

4. The method of claim 3 wherein the display panel is an LCD panel or an LTPS LCD panel.

5. The method of claim 1 wherein the PDA further comprises a plurality of peripherals, the peripherals comprising:

at least a memory for storing data;

at least a power supply port for providing operating power of the PDA; and a plurality of input keys for generating a plurality of input signals;

wherein when the PDA is in OFF mode, the memory is off while the input keys are sleep; when the PDA is in SHUTDOWN mode, the memory and the input keys are off; when the PDA is in ON mode, the memory and the power supply port are on while the input keys are operating between sleeping and on; when the PDA is in SCREEN TOGGLE mode, the memory and the power supply port are on while the input keys sleep; when the PDA is in STANDBY mode, the memory is in a low-power status, the input keys sleep, and the power supply port is on.

6. The method of claim 5 wherein a plurality of the input keys comprise at least a hot key, the method further comprising when the PDA is in STANDBY mode or in SCREEN TOGGLE mode, pressing the hot key will utilize the microprocessor to switch the PDA to ON mode.

7. The method of claim 1 wherein during a period when the microprocessor sleeps, the microprocessor is on during half of the period and off during half of the period.

8. The method of claim 1 wherein the PDA further comprises a gas gauge for detecting a remaining power volume of the PDA.

9. The method of claim 8 wherein the PDA further comprises an LED panel electrically connected to the microprocessor for displaying conditions of the power operating system, the method further comprising when the remaining power volume of the PDA detected by the gas gauge is lower than a threshold voltage, the microprocessor being capable of transmitting a message to the LED panel so as to produce a flash of light on the LED panel.

10. The method of claim 8 wherein when the remaining power volume of the PDA detected by the gas gauge is less than a critical voltage, the microprocessor is capable of switching the CPU from being on to being idle, or preventing the CPU from switching from being idle to being on when the CPU is idle.

11. The method of claim 8 wherein when the remaining power volume of the PDA detected by the gas gauge is less than a cut-off voltage, the PDA is switched from SCREEN TOGGLE mode to SHUTDOWN mode.

12. The method of claim 8 wherein when the remaining power volume of the PDA detected by the gas gauge is less than a cut-off voltage, the microprocessor is capable of switching the PDA from STANDBY mode to SHUTDOWN mode.

13. A PDA, comprising:

a power operating system comprising:

a slide switch for switching the PDA from OFF mode to SHUTDOWN mode;

a power button for switching the PDA among SHUTDOWN mode, ON mode, SCREEN TOGGLE mode, and STANDBY mode; and a screen-toggle key for switching the PDA from ON mode to SCREEN TOGGLE mode;

a CPU for processing data;

a microprocessor for supervising the power operating system; and a display module for displaying the data;

wherein when the slide switch is turned on, the PDA is switched from OFF mode to SHUTDOWN mode, wherein when the PDA is in OFF mode, the CPU, the microprocessor, and the display are all off, and when the PDA is in SHUTDOWN mode, the CPU and the display module are off while the microprocessor is on; when the power button is pressed, the PDA is switched from SHUTDOWN mode to ON mode, wherein when the PDA is in ON mode, the CPU, the microprocessor, and the display module are all on; when the screen-toggle key is pressed, the PDA is switched from ON mode to SCREEN TOGGLE mode, wherein when the PDA is in SCREEN TOGGLE mode, the CPU and the microprocessor are on while the display module is off; when the power button is pressed during the PDA being in SCREEN TOGGLE mode, the PDA is switched from SCREEN TOGGLE mode to ON mode; when the PDA is in ON mode with the power button pressed, the PDA is switched from ON mode to STANDBY mode, wherein when the PDA is in STANDBY mode, the CPU is idle, the microprocessor sleeps, and the display module is off; when the power button is pressed repeatedly, the PDA is switched between ON mode and STANDBY mode; an operating current of the CPU when the CPU is idle is smaller than the operating current when the CPU is on, and an operating current of the microprocessor when the microprocessor sleeps is smaller than the operating current when the microprocessor is on.

14. The PDA of claim 13 wherein the display module comprises a display panel and a front light, wherein when the PDA is in OFF mode, the display panel and the front light are off; when the PDA is in SHUTDOWN mode, the display panel and the front light are off; when the PDA is in ON mode, the display panel is on while the front light is operating between off and on; when the PDA is in SCREEN TOGGLE mode, the display panel and the front light are off; when the PDA is in STANDBY mode, the display panel and the front light are off.

15. The PDA of claim 14 wherein the display panel is an LCD panel or an LTPS LCD panel.

16. The PDA of claim 13 further comprising:

at least a memory for storing data;

at least a power supply port for providing operating power of the PDA; and a plurality of input keys for generating a plurality of input signals;

wherein when the PDA is in OFF mode, the memory is off while the input keys are sleep; when the PDA is in SHUTDOWN mode, the memory and the input keys are off; when the PDA is in ON mode, the memory and the power supply port are on while the input keys are operating between sleeping and on; when the PDA is in SCREEN TOGGLE mode, the memory and the power supply port are on while the input keys sleep; when the PDA is in STANDBY mode, the memory is in a low-power status, the input keys sleep, and the power supply port is on.

17. The PDA of claim 16 wherein a plurality of the input keys comprise at least a hot key for switching the PDA to ON mode when the PDA is in STANDBY mode or in SCREEN TOGGLE mode.

18. The PDA of claim 13 wherein during a period when the microprocessor sleeps, the microprocessor is on during half of the period and off during half of the period.

19. The PDA of claim 13 wherein further comprising:

an LED panel for display conditions of the power operating system; and a gas gauge for detecting a remaining power volume of the PDA.

20. The PDA of claim 19 wherein when the remaining power volume of the PDA detected by the gas gauge is lower than a threshold voltage, the microprocessor is capable of transmitting a message to the LED panel so as to produce a flash of light on the LED panel.

21. The PDA of claim 19 wherein when the remaining power volume of the PDA detected by the gas gauge is less than a critical voltage, the microprocessor is capable of switching the CPU from being on to being idle, or preventing the CPU from switching from being idle to being on when the CPU is idle.

22. The PDA of claim 19 wherein when the remaining power volume of the PDA detected by the gas gauge is less than a cut-off voltage, the PDA is switched from SCREEN TOGGLE mode to SHUTDOWN mode.

23. The PDA of claim 19 wherein when the remaining power volume of the PDA detected by the gas gauge is less than a cut-off voltage, the microprocessor is capable of switching the PDA from STANDBY mode to SHUTDOWN mode.

* * * * *